(12) United States Patent
Shibutani et al.

(10) Patent No.: US 7,491,766 B2
(45) Date of Patent: Feb. 17, 2009

(54) AQUEOUS EMULSION AND USE THEREOF

(75) Inventors: Mitsuo Shibutani, Ibaraki (JP); Kiyoharu Kitamura, Ibaraki (JP); Kinji Taki, Shizuoka (JP); Masaaki Yamada, Shizuoka (JP)

(73) Assignee: The Nippon Synthetic Chemical Industry Co., Ltd., Osaka-fu (JP)

( * ) Notice: Subject to any disclaimer, the term of this patent is extended or adjusted under 35 U.S.C. 154(b) by 0 days.

(21) Appl. No.: 11/081,360

(22) Filed: Mar. 4, 2005

(65) Prior Publication Data

US 2005/0197441 A1    Sep. 8, 2005

(30) Foreign Application Priority Data

Mar. 5, 2004    (JP) .............................. 2004-062165

(51) Int. Cl.
*C08K 3/20*    (2006.01)
*C08F 16/26*    (2006.01)

(52) U.S. Cl. .................. 524/459; 524/166; 524/503; 525/56; 525/59; 525/61; 525/62

(58) Field of Classification Search ................ 524/459, 524/166, 503; 525/56, 62, 59, 61
See application file for complete search history.

(56) References Cited

FOREIGN PATENT DOCUMENTS

| EP | 1158007 A1 | * | 11/2001 |
| JP | 09077948 A | * | 3/1997 |
| JP | 09-110925 |   | 4/1997 |
| JP | 09110925 A | * | 4/1997 |
| JP | 09124874 A | * | 5/1997 |
| JP | 11263848 A | * | 9/1999 |
| JP | 2002-060406 |   | 2/2002 |
| JP | 2003-277419 |   | 10/2003 |

OTHER PUBLICATIONS

Patent Abstracts of Japan, publication No. 2003-277419, "Aqueous Emulsion and Use of the Same", Kiyoharu et al.
Patent Abstracts of Japan, publication No. 09-110925, "Polyvinyl Alcohol Resin Having Acetoacetic Ester Group and its Production", Yoshiaki et al.
Patent Abstracts of Japan, publication No. 2002-060406, "Redispersible Synthetic Resin Powder and its Use", Yukitsugu et al.
Database WPI, Section Ch, Week 199727, Derwent Publications Ltd., XP-002328078, JP 09110925, Nippon Synthetic Chemical Industry Co., Apr. 28, 1997, "Abstract".

* cited by examiner

*Primary Examiner*—Randy Gulakowski
*Assistant Examiner*—Michael M Bernshteyn
(74) *Attorney, Agent, or Firm*—Ware, Fressola, Van Der Sluys & Adolphson

(57) ABSTRACT

The present invention provides an aqueous emulsion having excellent polymerization stability and standing stability and a redispersible powder. Specifically, the present invention relates to an aqueous emulsion of a polymer obtained by polymerizing an acrylic monomer in the presence of a polyvinyl alcohol containing an acetoacetic ester group; wherein the polyvinyl alcohol containing an acetoacetic ester group has block character [η] of 0.3 to 0.6, hydrolysis degree of at least 97% by mol and acetoacetic esterification degree of 0.01 to 1.5% by mol, and the value obtained by dividing the maximum value by the minimum value of the respective average acetoacetic esterification degree for each of the polyvinyl alcohol containing an acetoacetic ester group separated by particle size of 44 to 74, 74 to 105, 105 to 177, 177 to 297, 297 to 500 and 500 to 1680 μm is 1.0 to 3.0. Also, the present invention relates to a redispersible fiber obtained by drying the aqueous emulsion.

10 Claims, No Drawings

AQUEOUS EMULSION AND USE THEREOF

BACKGROUND OF THE INVENTION

The present invention relates to an aqueous emulsion having excellent polymerization stability and standing stability. More specifically, the present invention relates to an aqueous emulsion, in which polymer particles comprising an acrylic monomer which have polyvinyl alcohol containing an acetoacetic ester group with little difference in acetoacetic esterification degree by particle size and high blockiness attached to the surface thereof are the dispersoid, and a redispersible powder obtained by drying the aqueous emulsion. The aqueous emulsion and redispersible powder of the present invention can be used as an adhesive for particleboards and an additive for cement and mortar.

Conventionally, in order to give mechanical stability and frozen stability to an acrylic aqueous emulsion, polyvinyl alcohol (hereinafter referred to as PVA) is used as a protective colloid. However, although mechanical stability and frozen stability of the emulsion are improved, polymerization stability is insufficient and particularly, when the resin content in the emulsion is a high concentration of more than 50% by weight, polymerization cannot be conducted. Therefore, when PVA is used as a protective colloid of an acrylic aqueous emulsion, the resin content in the emulsion must be at most 50% by weight, which is a problem in terms of productivity. Also, the stability of the obtained emulsion is insufficient and there is the problem that viscosity increases over time.

Also, the vinyl acetate or acrylic aqueous emulsion and the redispersible powder obtained by drying the aqueous emulsion are used for mixing in cement and mortar. However, when the emulsion is mixed, there is the problem that flowability of the cement and mortar becomes poor over time and workability decreases.

Therefore, desired is development of a PVA protective colloid, by which polymerization can be conducted even when the resin content in the emulsion is a high concentration of at least 50% by weight, in the case that PVA is used as a protective colloid of an acrylic aqueous emulsion, and an aqueous emulsion or redipsersible powder, which does not decrease workability when mixed in cement and mortar.

As a means therefor, the method of using polyvinyl alcohol containing an acetoacetic ester group as an emulsifying dispersion agent is suggested and described in many patent documents. For example, JP-A-9-110925 discloses a process for preparing PVA containing an acetoacetic ester group (hereinafter referred to as AAPVA). AAPVA, in which the value obtained by dividing the maximum value with the minimum value of the acetoacetic esterification degree (hereinafter referred to as AA degree) of each AAPVA separated by particle size of 44 to 74, 74 to 105, 105 to 177, 177 to 297, 297 to 500 and 500 to 1680 μm is 1.0 to 3.0, is described as having excellent transparency and stability as an aqueous solution and being suitable as an emulsifying dispersion agent.

JP-A-2003-277419 discloses an aqueous emulsion in which PVA containing an active hydrogen group such as an acetoacetic ester group, a mercapto group and a diacetone acrylamide group, which has block character [η] of more than 0.6, hydrolysis degree of more than 95.0% by mol and low blockiness, is attached to a polymer. The mechanical stability, frozen stability and high temperature storage stability of the obtained aqueous emulsion and the mechanical stability of the redispersible powder obtained by drying the emulsion are described as being favorable. Furthermore, Examples are described, wherein polymerization is conducted so that the resin concentration in the emulsion becomes 50% by weight.

JP-A-2002-60406 discloses a powder obtained by attaching PVA containing an acetoacetic ester group or a mercapto group and having high blockiness of block character [η] of 0.3 to 0.6 to a polymer comprising an ethylenic unsaturated monomer and/or a diene monomer. It is described that the obtained powder is excellent in redipersibility and the properties of cement in which the powder is mixed are favorable. Furthermore, Examples are described, wherein polymerization is conducted so that the resin concentration in the emulsion becomes 50% by weight.

However, in recent years, from the viewpoint of increased productivity, the emulsion is preferably polymerized with as high resin concentration as possible. In the aqueous emulsions of the above patent documents, when polymerization is conducted with resin concentration in the emulsion of at least 50% by weight, problems occur, such as coarse particles develop due to insufficient polymerization stability and the viscosity of the emulsion increases due to insufficient standing stability.

Also, in the case that the aqueous emulsions and the redispersible powder of the above patent documents are mixed in cement and mortar, workability is favorable when the cement and mortar are used immediately after mixing, but when used some time after mixing, flowability of the cement and mortar decreases and there is the problem that workability decreases.

SUMMARY OF THE INVENTION

The object of the present invention is to provide an aqueous emulsion that is excellent in polymerization stability and standing stability, an adhesive (composition) and a redispersible powder.

The present invention relates to an aqueous emulsion obtained by polymerizing an acrylic monomer in the presence of a polyvinyl alcohol containing an acetoacetic ester group; wherein the polyvinyl alcohol containing an acetoacetic ester group has block character [η] of 0.3 to 0.6, hydrolysis degree of at least 97% by mol and acetoacetic esterification degree of 0.01 to 1.5% by mol, and the value obtained by dividing the maximum value by the minimum value of the respective average acetoacetic esterification degree (hereinafter referred to as acetoacetic esterification degree) for each of the polyvinyl alcohol containing an acetoacetic ester group separated by particle size of 44 to 74, 74 to 105, 105 to 177, 177 to 297, 297 to 500 and 500 to 1680 μm is 1.0 to 3.0.

Examples of preferable embodiments of the present invention are described below.

The polymer is preferably prepared by polymerizing an acrylic monomer under pH of 3 to 8.

The polymer is preferably prepared by polymerizing an acrylic monomer using persulfate as a polymerization initiator.

The glass transition temperature of the polymer is preferably 10 to 80° C.

The polymer is preferably prepared by further copolymerizing an ethylenic unsaturated monomer containing an acetoacetic group with the acrylic monomer.

The aqueous emulsion preferably further comprises 1 to 1000 ppm of an iron compound.

The present invention also relates to an adhesive composition comprising the aqueous emulsion.

The adhesive composition preferably contains an isocyanate crosslinking agent.

The present invention also relates to an adhesive for a particleboard and an adhesive for a middle density fiberboard (MDF) comprising the adhesive composition.

Furthermore, the present invention relates to a powder obtained from the aqueous emulsion.

DETAILED DESCRIPTION

The aqueous emulsion of the present invention is an aqueous emulsion obtained by polymerizing an acrylic monomer in the presence of AAPVA, wherein the polyvinyl alcohol containing an acetoacetic ester group has block character [η] of 0.3 to 0.6, hydrolysis degree of at least 97% by mol and acetoacetic esterification degree of 0.01 to 1.5% by mol, and the value obtained by dividing the maximum value by the minimum value of the respective acetoacetic esterification degree (hereinafter referred to as AA degree) for each of the polyvinyl alcohol containing an acetoacetic ester group separated by particle size of 44 to 74, 74 to 105, 105 to 177, 177 to 297, 297 to 500 and 500 to 1680 μm is 1.0 to 3.0.

AAPVA is obtained by introducing an acetoacetic ester group in PVA. As the raw material PVA, hydrolyzate obtained by hydrolyzing a polyvinyl acetate solution by an alkali or acid or derivatives thereof can be used. Also, hydrolyzate obtained by hydrolyzing a copolymer of vinyl acetate and a monomer copolymerizable therewith can be used, as long as the object of the present invention can be achieved.

Hydrolysis is conducted by dissolving a polymer such as polyvinyl acetate in alcohol or hydrated alcohol and then hydrolyzing using an alkali catalyst or an acid catalyst. Examples of the alcohol are methanol, ethanol, propanol and tert-butanol and particularly, methanol is preferably used. The concentration of the polymer in the alcohol can be determined according to the viscosity of the system and is usually within the range of 10 to 60% by weight. Examples of the catalyst used for hydrolysis are alkali catalysts such as hydroxides of alkaline metal such as sodium hydroxide, potassium hydroxide, sodium methylate, sodium ethylate, potassium methylate and lithium methylate and alcoholate and acid catalysts such as sulfuric acid, hydrochloric acid, nitric acid, methasulfonic acid, zeolite and cation exchange resin. The amount of the hydrolyzing catalyst is determined according to the hydrolysis method and the desired hydrolysis degree. When an alkali catalyst is used, usually, an amount of 0.1 to 30 milimol, preferably 2 to 17 milimol based on 1 mol of vinyl ester in polyvinyl acetate is suitable. The reaction temperature for the hydrolysis reaction is not particularly limited and is preferably 10 to 60° C., more preferably 20 to 50° C.

The raw material PVA must satisfy, for example, a specific hydrolysis degree, average polymerization degree, 1,2-glycol bond amount, swelling degree, elution ratio and particle size, as explained below.

The hydrolysis degree of the PVA is 97 to 100% by mol, particularly 97 to 99.5% by mol. When the hydrolysis degree is less than 97% by mol, stability when polymerizing the emulsion decreases significantly and obtaining the target aqueous emulsion becomes difficult.

The average polymerization degree of the PVA is not particularly limited and is preferably 50 to 2000, more preferably 100 to 1500, particularly preferably 100 to 600. PVA having polymerization degree of less than 50 is industrially difficult to produce. On the other hand, when the polymerization degree is more than 2000, the viscosity of the emulsion becomes too high and polymerization stability of the emulsion decreases, thus being unfavorable.

The 1,2-glycol bond amount of the PVA is preferably at least 1.5% by mol, more preferably 1.6 to 2.2% by mol, further preferably 1.6 to 1.8% by mol. When the 1,2-glycol bond amount is less than 1.5% by mol, temperature dependency of the viscosity of the emulsion becomes large and emulsion polymerization stability becomes poor, thus being unfavorable.

The 1,2-glycol bond amount is found from the value measured by $^1$H-NMR. First, after hydrolysis, the PVA is thoroughly washed with methanol. Then, a sample obtained by dissolving PVA dried under reduced pressure for 2 days at 90° C. in DMSO-$D_6$ in a concentration of 5% by weight and adding a few drops of trifluoroacetic acid is measured under the following conditions using $^1$H-NMR of 400 MHz (AVANCE DPX-400 made by Brucker).

Temperature: 80° C.

Flip angle: 45°

Pulse repeating time: 10 sec.

Total number of times: 16 times

When sodium 3-(trimethylsilyl)propionate is the reference material, the methine-derived peak of vinyl alcohol units belongs to 3.2 to 4.0 ppm (integral value A) and one methine-derived peak of 1,2-glycol bonds belongs to 3.25 ppm (integral value B) and the 1,2-glycol bond amount is calculated from the following equation.

1,2-glycol bond amount (% by mol)=$B/A \times 100$

The swelling degree of the PVA is adjusted to be at least 1.0, preferably 1.0 to 500, more preferably 3.0 to 200. When the swelling degree is less than 1.0, obtaining AAPVA having AA degree distribution of 1.0 to 3.0 is difficult. When the swelling degree is too high, the stirring load in preparation becomes too high, thus being unfavorable.

The swelling degree of the PVA is defined by the following equation.

Swelling degree=$(C-D)/D$

Herein, C represents the weight (g) of PVA swelled by absorbing water that remains on the filter paper (No. 2), when 270 g of water is added to 30 g of PVA, left for 24 hours at 25° C. and filtered for 10 minutes by 100 mmHg vacuum suction. D represents the weight (g) of the PVA swelled by absorbing water when dried at 105° C. to become constant mass.

The elution ratio of the PVA is adjusted to at least 3.0% by weight, preferably 3.0 to 97.0% by weight, more preferably 5.0 to 60.0% by weight. When the elution ratio is less than 3.0% by weight, polyvinyl alcohol containing an acetoacetic ester group, which has AA degree distribution of 1.0 to 3.0, is difficult to obtain. When the elution ratio is too high, the PVA resin adheres to the wall face of the reaction can, the stirring load when reacting is large and the reaction temperature lacks uniformity, when acetoacetic esterifying the PVA, and uniform distribution of the acetoacetic ester group (hereinafter referred to as AA group) among particles tends to be lost.

The elution ratio of the PVA is defined by the following equation.

Elution ratio (% by weight)=$(E/30) \times 100$

Herein, E represents the weight (g) of the nonvolatile content when water and the volatile components are removed from the filtrate obtained when 270 g of water is added to 30 g of PVA, left for 24 hours at 25° C. and filtered for 10 minutes by 100 mmHg vacuum suction.

To adjust the swelling degree and elution ratio of PVA, the method of thermally treating PVA while standing still or flowing to adjust crystallinity can be employed, but from the viewpoint of adjusting the volatile content, the method of thermally treating while flowing is preferable.

The particle size of PVA is preferably 20 to 5000 μm, more preferably 44 to 1680 μm. When the particle size is less than 20 μm, the particles tend to fuse together by the reaction heat and also, post-treatment such as washing and drying becomes difficult, thus being unfavorable. When the particle size is more than 5000 μm, contact of the PVA particles and the diketene used for the AA reaction becomes uneven and the reaction ratio of the diketene is decreased, thus being unfavorable. The particle size of the PVA can be adjusted by a standard sieve or by air separation after preparing the PVA.

The PVA may contain a few % by weight of the alcohols, esters or water used for preparing the PVA. However, these consume the diketene by reacting with the diketene, thereby lowering the reaction ratio of the diketene and therefore, are preferably decreased as much as possible in advance by heating and depressurizing.

Examples of the method for introducing the acetoacetic ester group in the PVA are the method of reacting PVA and diketene and the method of reacting PVA and acetoacetic ester. From the viewpoints of simplifying the preparation process and obtaining high quality AAPVA, the method of preparing by reacting PVA and diketene is preferable. Furthermore, from the viewpoint of the advantages that the amount of diketene is small and the reaction yield of the diketene improves, the method of reacting PVA and diketene is preferable. Hereinafter, the method of reacting PVA and diketene is described, but not limited thereto.

As the method of reacting PVA and diketene, the method of directly reacting PVA and liquid of gaseous diketene, the method of absorbing an organic acid to PVA and spraying liquid or gaseous diketene in an inert gas atmosphere to conduct reaction and the method of spraying a mixture of organic acid and liquid diketene to PVA to conduct the reaction can be employed.

To uniformly adsorb and absorb liquid diketene in PVA by a means such as spraying, stirring or fluidization is preferably continued in an inert gas atmosphere at 20 to 120° C. for a specified time.

When gaseous diketene is reacted with PVA, the contact temperature is preferably 30 to 250° C. more preferably 50 to 200° C. The PVA and diketene gas are preferably contacted under the conditions of a temperature at which the diketene gas does not become fluid when contacted with PVA under diketene partial pressure, but part of the gas can become liquid drops. The contact time is determined from the range of 1 minute to 6 hours depending on the contact temperature. That is, when the temperature is low, the contact time is long and when the temperature is high, the contact time is short. When diketene gas is supplied, the diketene gas can be supplied alone or a mixed gas of diketene gas and inert gas can be supplied. The temperature can be increased after diketene gas is absorbed in PVA, but preferably, PVA is contacted with the gas after heating.

In the method of reacting PVA and diketene using an organic acid, acetic acid is most preferable as the organic acid and propionic acid, butyric acid and isobutyric acid can also be used. The amount of the organic acid that is used is an amount within the range that the PVA in the reaction system is capable of absorbing, in other words an amount by which organic acid independent from the PVA in the reaction system does not exist. Specifically, 0.1 to 80 parts by weight, preferably 0.5 to 50 parts by weight, particularly preferably 5 to 30 parts by weight of organic acid based on 100 parts by weight of PVA is suitable. When the amount is less than 0.1 part by weight, the effects of the present invention are difficult to obtain. On the other hand, when the amount is more than 80 parts by weight, the organic acid is excessively present that a product having an uneven AA degree tends to be obtained and the amount of unreacted diketene tends to be large.

To uniformly adsorb and absorb the organic acid in PVA, the method of spraying the organic acid alone to PVA and the method of dissolving the organic acid in a suitable solvent and spraying the obtained solution can be employed.

As the catalyst that is used for introducing the aceoacetic ester group, sodium acetate, potassium acetate and basic compounds such as primary amine, secondary amine and tertiary amine are effective. The amount of the catalyst can be less than the amount in known reaction methods and is preferably 0.1 to 5.0% by weight based on PVA. PVA usually contains sodium acetate and so often, a catalyst may not need to be added. When the amount of the catalyst is too large, side reactions of diketene tend to occur, thus being unfavorable. To control the consumption of diketene by water in the PVA and improve the reaction ratio of diketene, a small amount of an acid anhydride such as acetic anhydride can be added.

As the reaction machine for conducting acetoacetic esterification, any machine that is heatable and equipped with a stirrer can be used. For example, a kneader, a Henschel mixer, a ribbon blender and various other blenders and stirring and drying machines can be produced.

When the AAPVA used in the present invention is separated into particle size of 44 to 74, 74 to 105, 105 to 177, 177 to 297, 297 to 500 and 500 to 1680 μm, the value obtained by dividing the maximum value by the minimum value of the respective average acetoacetic esterification degree (AA degree distribution) is 1.0 to 3.0, preferably 1.0 to 2.0, more preferably 1.0 to 1.5. When the AA degree distribution is more than 3.0, an extremely small amount of undissolved substances may be present when the AAPVA is dissolved in water, the transparency decreases and the viscosity may increase when AAPVA is stored for a long period of time as an aqueous solution. Also, the viscosity when AAPVA is stored for a long period of time as powder and thereafter made into an aqueous solution is higher than when powder is made into an aqueous solution immediately after preparation and the object of the present invention cannot be achieved.

The AA degree distribution is found by separating AAPVA into particle size of 44 to 74, 74 to 105, 105 to 177, 177 to 297, 297 to 500 and 500 to 1680 μm, calculating the respective AA degree from the alkali consumption by hydrolysis of AA functional group and dividing the maximum value by the minimum value of the AA degree. When only one AA degree can be calculated as the particle size distribution of the AAPVA is narrow and all of the AAPVA fit into a specific particle size, the AA degree distribution is 1.0.

Herein, particle size of 44 to 74 μm refers to the particle size of particles sieved by 350 mesh (44 μm) on and 200 mesh (74 μm) pass using a standard metal sieve, particle size of 74 to 105 μm refers to the particle size of particles sieved by 200 mesh (74 μm) on and 145 mesh (105 μm) pass, particle size of 105 to 177 μm refers to the particle size of particles sieved by 145 mesh (105 μm) on and 80 mesh (177 μm) pass, particle size of 177 to 297 μm refers to the particle size of particles sieved by 80 mesh (177 μm) on and 48 mesh (297 μm) pass, particle size of 297 to 500 μm refers to the particle size of particles sieved by 48 mesh (297 μm) on and 32 mesh (500 μm) pass, and particle size of 500 to 1680 μm refers to the particle size of particles sieved by 32 mesh (500 μm) on and 10.5 mesh (1680 μm) pass.

The method for obtaining AAPVA having the above AA degree distribution is not particularly limited. Examples are the method of adjusting the swelling degree and particle size of the raw material PVA to a specific range, the method of removing particle size sections having high or low AA degree after preparing the AAPVA and the method of adjusting the average AA degree of AAPVA to a low degree. Usually, adjusting the swelling ratio, the elution ratio and the particle size of PVA is practical.

The AA degree is 0.01 to 1.5% by mol, preferably 0.05 to 1.0% by mol. When the AA degree is less than 0.01% by mol, water resistance and mechanical strength of the emulsion is insufficient, thus being unfavorable. When the AA degree is more than 1.5% by mol, the polymerization stability of the acrylic emulsion is insufficient, thus being unfavorable.

The block character [η] of the AAPVA must be 0.3 to 0.6. PVA having block character of less than 0.3 is industrially difficult to produce. On the other hand, when the block character is more than 0.6, emulsion polymerization stability and redispersibility becomes poor and achieving the object of the present invention becomes difficult.

The block character [η] is found from the absorption strength ratio of peaks [(OH,OH)dyad=46 to 49 ppm absorption, (OH,OR)dyad=43.5 to 45.5 ppm absorption, (OR,OR)dyad=40 to 43 ppm absorption, OR represents O-acetic acid group and/or O-acetoacetic acid group] based on the methylene carbon part observed in the range of 40 to 49 ppm measured by $^{13}C$-NMR and is calculated from the following formula.

$$[\eta]=(OH,OR)/2(OH)(OR)$$

Herein, (OH,OR), (OH) and (OR) are all calculated by molar fraction. Also, (OH) is the hydrolysis degree (molar fraction) calculated from the integral ratio of $^{13}C$-NMR and (OR) represents the molar fraction of acetic acid groups and acetoacetic acid groups at that time.

The hydrolysis degree of AAPVA is 97 to 100% by mol, preferably 97.5 to 99.5% by mol. When the hydrolysis degree is less than 97% by mol, the stability when polymerizing the emulsion decreases significantly that obtaining the target aqueous emulsion becomes difficult.

The hydrolysis degree of AAPVA is calculated from the following equation.

$$\begin{aligned}\text{Hydrolysis degree of } AAPVA\ (\%\text{ by mol}) = \\ 100 - \text{amount of remaining acetic acid groups (\% by mol)} - \\ \text{amount of remaining acetoacetic acid groups (\% by mol)}\end{aligned}$$

The aqueous emulsion of the present invention is obtained by emulsion polymerization of an acrylic monomer in the presence of AAPVA.

Examples of the acrylic monomer are methacrylic esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate, acrylic esters and methacrylic acid. The acrylic monomer can be used alone or a mixture of two or more kinds can be used. Also, the following monomers can be used together as long as the effects of the present invention are not lost. Examples are vinyl ester monomers such as vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl varsatate; diene monomers such as butadiene-1,3,2-methylbutadiene and 1,3 or 2,3-dimethylbutadiene-1,3,2-chlorobutadiene-1,3; olefin monomers such as ethylene, propylene, 1-butene and isobutene; halogenated olefin monomers such as vinyl chloride, vinylidene chloride, vinyl fluoride and vinylidene fluoride; acrylamide monomers such as methacrylamide, N-methylolacrylamide, N,N-dimethylacrylamide, acrylamide-2-methylpropane sulfonic acid and diacetoneacrylamide; nitrile monomers such as methacrylnitrile; styrene monomers such as styrene and α-methylstyrene; vinyl ethers such as methylvinyl ether, n-propylvinyl ether, i-propylvinyl ether, n-butylvinyl ether, i-butylvinyl ether, t-butylvinyl ether, dodecylvinyl ether and stearylvinyl ether; and allyl monomers such as allyl acetate and allyl chloride. Further examples are compounds containing a carboxyl group such as fumaric acid, maleic anhydride, itaconic anhydride, trimellitic anhydride and esters thereof; compounds containing a sulfonic acid group such as ethylene sulfonic acid, allyl sulfonic acid, methallyl sulfonic acid and 2-acrylamide-2-methylpropane sulfonic acid; vinyl silane conpounds such as vinyltrimethoxysilane; isopropenyl acetate, 3-methacrylamidepropyltrimethyl ammonium chloride, 3,4-diacethoxybutene and vinylethylene carbonate.

Furthermore, besides the acrylic monomer, an ethylenic unsaturated monomer containing an acetoacetic ester group is preferably used as the monomer, from the viewpoint that adhesion strength improves when the obtained aqueous emulsion is used as an adhesive. The ethylenic unsaturated monomer containing an acetoacetic ester group can be prepared by a known method and for example, is prepared by the following method.

(1) An ethylenic unsaturated monomer containing an acetoacetic ester group is prepared by reacting diketene with an ethylenic unsaturated monomer containing a functional group such as a hydroxyl group, an amide group, an urethane group, an amino group and a carboxyl group. Examples of the ethylenic unsaturated monomer containing a functional group are 2-hydroxyethyl acrylate, 2-hydroxyethyl methacrylate, hydroxypropyl methacrylate and 2-hydroxy-3-chloropropyl acrylate. The reaction can be conducted in the absence of a catalyst or in the presence of a catalyst such as tertiary amine, an acid (such as sulfuric acid), a basic salt (such as sodium acetate) and an organic metal compound (such as dibutyl tin laurate).

(2) An ethylenic unsaturated monomer containing an acetoacetic ester group is prepared by ester exchange reaction of an ethylenic unsaturated monomers containing a functional group and an acetoacetic ester. The reaction is preferably conducted in the presence of an ester exchange catalyst such as calcium acetate, zinc acetate and lead oxide.

The glass transition temperature (Tg) of the polymer comprising the acrylic monomer and the ethylenic unsaturated monomer containing an acetoacetic ester group is preferably 10 to 80° C., more preferably 30 to 80° C., further preferably 50 to 80° C. When Tg is lower than 10° C., heat pressing resistance and adhesion strength are insufficient when used as an adhesive. Also, when Tg is higher than 80° C., the film-forming properties of the adhesive layer become poor, thus being unfavorable. When two or more kinds of monomers are used, the composition ratio of the monomers is preferably adjusted so that the Tg of the copolymer is within the above temperature range.

The Tg (° C.) of the copolymer obtained when two or more kinds of monomers are used can be calculated from the following equation. The following equation shows an example of the case in which two kinds of monomers X and Y are used, so that monomer X is x % by mol and monomer Y is y % by mol when the total monomer weight is 100% by mol.

$$1/(Tg \text{ of copolymer} + 273) =$$
$$(x/100) \times (1/(Tg \text{ of homopolymer of monomer } X + 273)) +$$
$$(y/100) \times (1/(Tg \text{ of homopolymer of monomer } Y + 273))$$

The aqueous emulsion of the present invention is prepared by adding an acrylic monomer all at once or continuously in the presence of water, AAPVA and a polymerization initiator, heating and then stirring.

The concentration of the acrylic monomer is preferably 10 to 70% by weight, more preferably 45 to 60% by weight of the entire system. When the concentration is less than 10% by weight, productivity is low, as industrial productivity is not satisfied, and when the concentration is more than 70% by weight, emulsion polymerization cannot progress with stability and a favorable emulsion cannot be obtained.

The amount of the AAPVA differs to an extent depending on the type thereof and the resin content of the emulsion, but usually is preferably 0.1 to 30% by weight, more preferably 1 to 25% by weight, further preferably 2 to 20% by weight based on the entire reaction system. When the amount is less than 0.1% by weight, maintaining the polymer particles in a stable emulsion state becomes difficult and on the other hand, when the amount is more than 30% by weight, the viscosity of the emulsion increases too much that workability decreases, thus being unfavorable.

As the polymerization initiator, usually, for example, potassium persulfate, ammonium persulfate or potassium bromate is used alone or together with sodium hydrogen sulfite. Also, aqueous redox-type polymerization initiators can be used, such as hydrogen peroxide-tartaric acid, hydrogen peroxide-iron salt, hydrogen peroxide-ascorbic acid-iron salt, hydrogen peroxide-rongalit and hydrogen peroxide-rongalit-iron salt. Specifically, a catalyst comprising an organic peroxide and a redox-type initiator such as "Kayabutyl B" (available from Kayaku Akzo Corporation) and "Kayabutyl A-50C" (available from Kayaku Akzo Corporation) can be used. Particularly, from the viewpoint of accelerating graft polymerization of the acrylic monomer and AAPVA and improving polymerization stability, persulfates are preferably used. Among persulfates, ammonium persulfate is particularly preferable. The method for adding the polymerization initiator is not particularly limited and the method of adding all at once at the beginning of polymerization or the method of adding continuously as polymerization progresses can be employed.

During polymerization, the pH is preferably maintained at 3.0 to 8.0, more preferably 3.5 to 6.0, further preferably 4.0 to 6.0, from the viewpoint of improving polymerization stability of the emulsion. When the pH is less than 3.0, the polymerization stability of the emulsion is insufficient. When the pH is too high, the polymerization rate decreases significantly, thus being unfavorable. In order to maintain the pH in the above range, a buffer is preferably added before and/or during polymerization. When added during polymerization, the buffer can be added divided into portions or can be added continuously. The buffer is not particularly limited and for example, sodium acetate, potassium acetate, sodium carbonate and sodium phosphate can be used. Particularly, an aqueous solution of sodium acetate is preferably used.

Also, when an iron compound is added to the emulsion polymerization system, emulsion polymerization can be controlled better, agglomeration tends to not occur in emulsion polymerization and polymerization stability improves significantly, thus being favorable. The iron compound is not particularly limited, but preferably, at least one iron compound selected from the group consisting of iron oxide, ferrous chloride, ferrous sulfate, ferric chloride, ferric nitrate and ferric sulfate is used. Particularly, ferric chloride is preferably used.

The amount of the iron compound is preferably 1 to 1000 ppm, more preferably 5 to 200 ppm, further preferably 5 to 100 ppm based on the aqueous emulsion after emulsion polymerization. When the amount of the iron compound is less than 1 ppm, the effect of adding the iron compound is poor and on the other hand, when the amount is more than 1000 ppm, the obtained emulsion and the membrane obtained from the emulsion tend to be colored. Also, the water resistance of the membrane obtained from the emulsion tends to decrease, thus being unfavorable.

With respect to the time of adding the iron compound, the compound is preferably added before emulsion polymerization, but can also be added during or after emulsion polymerization.

In emulsion polymerization, for example, an aqueous polymer, a nonionic surfactant, an anionic surfactant or a cationic surfactant can also be used as an emulsion dispersion stabilizer.

Examples of the aqueous polymer are PVA such as unmodified PVA excluding AAPVA, PVA containing a carboxyl group, formalates, acetalates, butylalates, urethanates and esters with sulfonic acid or carboxylic acid of PVA and hydrolyzates of copolymers of vinyl ester and a monomer copolymerizable therewith. Examples of the monomer copolymerizable with vinyl ester are olefins such as ethylene, butylene, isobutylene, α-octene, α-dodecene and α-octadecene; unsaturated acids such as acrylic acid, methacrylic acid, chrotonic acid, maleic acid, maleic anhydride and itaconic acid and salts and mono or dialkylesters thereof; nitriles such as acrylonitrile and methacrylonitrile; amides such as acrylamide, diacetonacrylamide and methacrylamide; olefin sulfonic acids such as ethylenesulfonic acid, allylsulfonic acid and methallylsulfonic acid and salts thereof; alkyl vinyl ethers, vinyl ketone, N-vinylpyrrolidone, vinyl chloride and vinylidene chloride.

Also, cellulose derivatives such as methyl cellulose, ethyl cellulose, hydroxymethyl cellulose, hydroxypropylmethyl cellulose, hydroxybutylmethyl cellulose, hydroxyethyl cellulose, carboxymethyl cellulose, aminomethyl hydroxypropyl cellulose and aminoethyl hydroxypropyl cellulose; starch, tragacanth, pectin, glue, alginic acid or salt thereof, gelatin, polyvinylpyrrolidone, polyacrylic acid or salt thereof, polymethacrylic acid or salt thereof, polyacrylamide, polymethacrylamide, copolymers of vinyl acetate and unsaturated acids such as maleic acid, maleic anhydride, acrylic acid, methacrylic acid, itaconic acid, fumaric acid and crotonic acid; copolymers of styrene and the above unsaturated acids; copolymers of vinyl ether and the above unsaturated acids; and salts or esters of the above copolymers can be used as the aqueous polymer.

Examples of the nonionic surfactant are polyoxyethylene-alkylether types, polyoxyethylene-alkylphenol types, polyoxyethylene-polyol ester types, esters of polyol and fatty acid and oxyethylene-oxypropylene block polymers.

Examples of the anionic surfactant are sulfates of higher alcohol, alkali salts of higher fatty acids, sulfates of polyoxyethylene alkylphenol ether, alkyl benzene sulfonate, naphthaline sulfonate formalin condensate, alkyldiphenylether sulfonate, dialkylsulfosuccinate and phosphatic ester salt of higher alcohol.

An example of the cationic surfactant is higher alkylamine salt.

Furthermore, in emulsion polymerization, plasticizers such as phthalic ester and phosphoric ester and pH adjusters such as sodium carbonate, sodium acetate and sodium phosphate can also be used.

The polymerization temperature is preferably 70 to 90° C., more preferably 75 to 85° C. When the polymerization temperature is lower than 70° C., graft polymerization of the acrylic monomer and AAPVA is not promoted and the polymerization stability decreases, thus being unfavorable. When the temperature is higher than 90° C., the protective colloid properties of AAPVA decrease and emulsion polymerization has difficulty progressing with stability, thus being unfavorable.

The average particle size of the polymer particles is preferably at least 200 nm, more preferably at least 300 nm. By adjusting the average particle size to at least 200 nm, an emulsion having minimum film-forming temperature (MFT) of at least 10° C. is obtained and mechanical stability improves.

Herein, the average particle size refers to the number average particle size (Dn) measured under the following conditions using a dynamic light-scattering photometer "DLS-700" made by Otsuka Electronics Co., Ltd. and calculated by the histogram method.

(Sample)

The emulsion is diluted in deionized water to become a 0.05% by weight aqueous solution.

(Measurement Conditions)

The slit-switching knob ($\Phi$0.1 to $\Phi$0.2) and the ND filter knob (ND50 to ND25) are adjusted so that the CPS value (light intensity) is 5000 to 12000 and measurement is conducted under the following conditions.

SAMPLING TIME (standard clock): 40 µsec.

ACCUM. TIME (total number of times): 100 times

CORRE. CH (set value that converges correlation): 256

By removing water from the aqueous emulsion of the present invention, a powder having excellent redispersibility can be obtained. The method for removing the water is not particularly limited and the methods of spray drying, heat drying, blow-drying, freeze drying, drying by pulse impact waves and drying by a belt press dehydrator can be employed. From an industrial point of view, spray drying is suitable. For spray drying, the usual spray drier which sprays and dries the liquid can be used. A disc-type or a nozzle type can be used depending on the spraying method and either can be used in the present invention. Examples of the heat source are hot air and hot steam.

The spray drying conditions are determined according to the size and type of spray drier and the concentration, viscosity and flow rate of the emulsion. The drying temperature is preferably 80 to 150° C., more preferably 100 to 140° C. When the drying temperature is lower than 80° C., drying is insufficient and when the temperature is higher than 150° C., the properties of the polymer are changed by heat.

Because the redispersible powder may cake together, agglomerate and become blocked in storage, an anti-caking agent is preferably used in order to improve storage stability. The anti-caking agent can be added to the emulsion powder after spray drying and homogeneously mixed, but from the viewpoints of mixing homogeneously and the effect of preventing caking, the emulsion is preferably sprayed in the presence of an anti-caking agent when spray drying the emulsion. Particularly, the method of simultaneously spraying and drying the emulsion and the anti-caking agent is preferable.

As the anti-caking agent, inorganic powder of fine particles is preferable. Examples are calcium carbonate, clay, silicic anhydride aluminum silicate, white carbon, talc and alumina white. Particularly, silicic anhydride, aluminum silicate and calcium carbonate having average particle size of about 0.01 to 0.5 µm is preferable. The amount of the anti-caking agent is not particularly limited, but is preferably 2 to 20% by weight based on the powder.

The aqueous emulsion and the redispersible powder of the present invention are useful as paper processing agents, adhesives, coatings, fiber processing agents, cosmetics, materials for civil engineering and construction and tackifiers (pressure-sensitive adhesives). Particularly, the aqueous emulsion and the redispersible powder are extremely useful as additives for cement and mortar and adhesives for wood.

When the aqueous emulsion or the redispersible powder of the present invention is used for an adhesive composition, besides the aqueous emulsion or the redispersible powder, the adhesive composition can contain an aqueous polymer such as PVA, a crosslinking agent such as a polyvalent isocyanate compound, an anti-hydrating agent, pigment, a dispersing agent, a defoaming agent, an oil solution, a viscosity modifier, a tackifier, a thickening agent and a water-retaining agent. Of these, the crosslinking agent is particularly important. Examples of the crosslinking agent are amine compounds including aliphatic amines such as melamine, acetoguanamine, benzoguanamine, urea, alkylated methylol urea, alkylated methylol melamine, condensate of acetoguanamine or benzoguanamine and formaldehyde, diethylenetriamine, triethylenetetramine, tetraethylenepentamine, trimethylhexamethylenediamine and polyetherdiamine, aromatic amines such as metaxylenediamine and diaminodiphenylmethane and modified amines such as amine adduct and polyamideamine; aldehyde compounds including monoaldehydes such as formaldehyde, acetaldehyde, propionaldehyde and butylaldehyde and dialdehydes such as glyoxal, glutaraldehyde, malondialdehyde, succindialdehyde, maleindialdehyde and phthaldialdehyde; hydrazine compounds including hydrazine, hydrazine hydrate, inorganic salts of hydrochloric acid, sulfuric acid, nitric acid, nitrous acid, phosphoric acid, thiocyanic acid or carbonate acid of hydrazine and organic salts of formic acid or oxalic acid of hydrazine, substitution compounds of hydrazine in which one hydrogen is substituted with methyl, ethyl, propyl, butyl or aryl, substitution compounds of hydrazine in which two asymmetric hydrogen are substituted with 1,1-dimethyl, 1,1-diethyl or 4-n-butyl-metal and substitution compounds of hydrazine in which two symmetric hydrogen are substituted with 1,2-dimethyl, 1,2-diethyl and 1,2-diisopyl; compounds containing a formamide group including polymers comprising monomers such as vinylformamide, N-allylformamide and acrylformamide and copolymers of such monomers and vinyl acetate, styrene or methyl (meth)acrylate; isocyanate compounds including ketoxime block compounds such as tolylenediisocyanate, hydrogenated trilenediisocyanate, adduct of trimethylolpropane-trilenediisocyanate, triphenylmethanetriisocyanate, methylenebis-4-phenylmethanetriisocyanate and methylenebisisoholondiisocyanate; polyvalent metal ions such as aluminum acetate, copper acetate, aluminum chloride, copper chloride, lead chloride, cobalt chloride, iron(III) chloride, aluminum sulfate and iron(III) sulfate. Also, a compound containing either a zirconyl compound such as basic zirconyl chloride and zirconyl aluminum carbonate, titanium tetrachloride or a compound containing a methylol group or an alkoxymethyl group can be used.

For example, when the aqueous emulsion is used, preferably 10 to 98% by weight, more preferably 40 to 90% by weight of the aqueous emulsion is contained in the adhesive composition containing the crosslinking agent. When the amount is less than 10% by weight, the adhesion strength decreases and the drying time becomes long, thus being unfavorable. When the amount is more than 98% by weight, workability decreases and the desired adhesion strength may not be obtained, thus being unfavorable.

The adhesive composition of the present invention can be used as an adhesive for cardboard, inserting paper, paper tubes, lumber, plywood, laminated veneer lumber (LVL) for construction, particleboards, laminated lumber and fiberboards. Particularly, in particleboards obtained by applying an adhesive comprising thermosetting resin such as urea resin or melamine resin to wood chips as an adhesive for wood, forming in the shape of a board and then heat pressing, the problem of VOC such as acetaldehyde and formalin is surfacing and becoming a social problem. The adhesive composition of the present invention is extremely useful as the adhesive for particleboards, from the viewpoint that the problem of VOC does not occur.

The particleboard using the adhesive composition of the present invention as the adhesive is prepared by applying a main agent comprising the aqueous emulsion of the present invention and a crosslinking agent or a main agent comprising the redispersible powder of the present invention, a crosslinking agent and water to wood chips, forming and heat pressing.

When the aqueous emulsion or the redispersible powder is used as the main agent, the formaldehyde emission from the particleboard can be kept to a level that is significantly lower than the $E_0$-type (0.5 mg/l) prescribed in JIS A5908. Furthermore, the adhesion property can be maintained at a high level that passes the P-type and adhesion durability can be improved.

When the adhesive of the present invention is used for preparing a particleboard, besides the adhesive component of the main agent, a suitable amount of a wax emulsion can be added in order to give water resistance. In the preparation process, MDI can be used as the adhesive for the core layer and the adhesive of the present invention can be used for the surface layers. When MDI is used for the surface layer, not only is workability lost, as the MDI adheres to the hot plate in hot pressing, but also the surface properties of the particleboard are lost. Thus, the embodiment of using the adhesive of the present invention as the adhesive for the surface layer is preferable.

The fiberboard using the adhesive of the present invention is the generic term for board-shaped products molded with wood fiber as the main material. Fiberboards are classified according to the density of the board into the three types of insulation boards (soft fiber board, IB), medium density fiberboards (middle-grade fiberboard, MDF) and hard boards (hard fiberboard, HB).

The fiber is prepared by the method mechanically fibrillating chips steamed under high temperature and high pressure using a refiner. With respect to the process for preparing a fiberboard, there is the wet method and the dry method. The wet method is the method of using a large amount water as the medium from fibrillation to forming.

The adhesive of the present invention can be used in any of the fiberboards of IB, MDF and HB, but is suitably used in MDF and HB, more suitably in MDF.

MDF is mainly prepared by the dry method. The adhesive of the present invention is added to dried fiber and the fiber is shaped into a mat and then heat pressed to form a board having density of 0.35 to 0.80 g/cm$^3$. For example, when an adhesive containing the aqueous emulsion of the present invention is used, the concentration of the aqueous emulsion in the adhesive is preferably 10 to 98% by weight, more preferably 40 to 98% by weight. When the concentration is less than 10% by weight, the adhesion strength decreases, thus being unfavorable. When the concentration is more than 98% by weight, workability decreases and the desired adhesion strength may not be obtained, thus being unfavorable. The amount of the adhesive of the present invention is 4 to 20% by weight, more preferably 6 to 15% by weight based on the fiber.

The fiber is dried by blowing air at a low temperature using a flash drier. The adhesive can be added to the fiber directly before drying (blowin method) or after drying using a blender. The blow-in method is the method of evenly applying the adhesive to the fiber, utilizing the phenomenon that when fiber prepared by the refiner enters the small caliber high pressure pipe and thereafter enters the large caliber pipe of the drier, the pressure decreases suddenly and the fibers scatter at the outlet in the manner of air turbulence. When the temperature is raised to dry the fiber in a short period of time, the adhesive is pre-cured and there is the problem that tuck becomes lower compared to mechanical blending.

The side face of the MDF obtained using the adhesive of the present invention is dense and is perpendicular to the surface. Also, the surface is smooth and processability and printability are favorable. The MDF board can be used for furniture, cabinets, construction foundation (floors, inner walls, roof) and fixture materials.

The core layer can be strand particles and fiber can be accumulated thereon as the surface layer. This can be pressed all at once using a steam spray press.

The adhesive of the present invention can be used for preparing plywood.

As plywood, three-ply plywood obtained by laminating three flat boards is known as construction material. The three-ply plywood using the adhesive of the present invention can be prepared by the usual method. That is, the adhesive of the present invention is applied to both faces of the middle flat board and flat boards of the same size as the middle board are respectively laminated to both faces of the middle board. A specified amount (100 to 150) of these boards are laminated and pressurized using a cold press machine at room temperature to set the adhesive (cold press step). Thereafter, the plywood is retrieved one set at a time and pressure is applied while heating using a hot press machine to fix by pressing (hot press step) to prepare the plywood. For example, when the adhesive that is used contains the aqueous emulsion of the present invention, the concentration of the aqueous emulsion in the adhesive is preferably 30 to 80% by weight, more preferably 40 to 75% by weight. When the concentration is less than 30% by weight, the adhesion strength decreases, thus being unfavorable. When the concentration is more than 80% by weight, workability decreases and the desired adhesion strength may not be obtained, thus being unfavorable.

When the aqueous emulsion or redispersible powder of the present invention is used as an additive for cement and mortar, for example when redispersible powder is used, the amount of the powder is preferably 5 to 30 parts by weight, more preferably 10 to 30 parts by weight based on 100 parts by weight of the cement or mortar, from the viewpoint of properties of the obtained cured article. Also, from the viewpoint of economical efficiency, the amount is preferably 5 to 15 parts by weight, more preferably 8 to 12 parts by weight.

The method for mixing the aqueous emulsion or redispersible powder in cement or mortar can be the method of mixing (compounding) in the cement or mortar in advance, the method of mixing (compounding) in water in advance and the method of mixing the cement or mortar, water and the aqueous emulsion or redispersible powder all at once.

Hereinafter, the present invention is explained in detail by means of Examples, but are not limited thereto. In Examples and Comparative Examples, "part(s)" represents "parts by weight".

PREPARATION EXAMPLE 1

(Preparation of AAPVA (a))

PVA powder having particle size of 63 to 1680 µm, swelling degree of 3.5 and elution ratio of 12.1% by weight was obtained by conducting thermal treatment at 80° C. for 60 minutes in the final step of drying in preparation of PVA (hydrolysis degree 99.5% by mol, polymerization degree 1280). A 7 L kneader was charged with 444 parts of the obtained PVA powder as the raw material and 100 parts of acetic acid was added thereto to swell the PVA. After raising the temperature to 60° C. while stirring at a rotational speed of 20 rpm, a mixture of 8 parts of diketene and 32 parts of acetic acid was dropped over 4 hours and reaction was conducted further for 30 minutes. After the reaction was completed, the mixture was washed with 500 parts of methanol and then dried at 70° C. for 6 hours to obtain AAPVA (a) having AA degree of 0.50% by mol (diketene conversion ratio of 50% by mol). The AA degree of 6 sections of the obtained AAPVA separated by 7 kinds of sieves was measured and the results were as follows.

44 to 74 µm: 0.58% by mol
74 to 105 µm: 0.56% by mol
105 to 177 µm: 0.53% by mol
177 to 297 µm: 0.50% by mol
297 to 500 µm: 0.47% by mol
500 to 1680 µm: 0.42% by mol The AA degree distribution (maximum AA degree/minumum AA degree) was 1.4, the block character [η] was 0.55 and the hydrolysis degree was 99.0% by mol.

PREPARATION EXAMPLE 2

(Preparation of AAPVA (b))

PVA powder having particle size of 63 to 1680 µm, swelling degree of 3.5 and elution ratio of 12.1% by weight was obtained by conducting thermal treatment at 80° C. for 60 minutes in the final step of drying in preparation of PVA (hydrolysis degree 98.0% by mol, polymerization degree 1280). AAPVA (b) having AA degree of 0.50% by mol (diketene conversion ratio of 50% by mol) was prepared in the same manner as in Preparation Example 1 except that the above PVA powder was used. The AA degree was as follows.

44 to 74 µm: 0.58% by mol
74 to 105 µm: 0.55% by mol
105 to 177 µm: 0.52% by mol
177 to 297 µm: 0.49% by mol
297 to 500 µm: 0.46% by mol
500 to 1680 µm: 0.42% by mol The AA degree distribution (maximum AA degree/minumum AA degree) was 1.4, the block character [η] was 0.54 and the hydrolysis degree was 97.5% by mol.

PREPARATION EXAMPLE 3

(Preparation of AAPVA (c))

PVA powder having particle size of 63 to 1680 µm, swelling degree of 0.8 and elution ratio of 2.7% by weight was obtained by conducting thermal treatment at 105° C. for 120 minutes in the final step of drying in preparation of PVA (hydrolysis degree 99.0% by mol, polymerization degree 1280). AAPVA (c) having AA degree of 0.45% by mol (diketene conversion ratio of 45% by mol) was prepared in the same manner as in Preparation Example 1 except that the above PVA powder was used. The AA degree was as follows.

44 to 74 µm: 0.77% by mol
74 to 105 µm: 0.62% by mol
105 to 177 µm: 0.52% by mol
177 to 297 µm: 0.40% by mol
297 to 500 µm: 0.29% by mol
500 to 1680 µm: 0.18% by mol The AA degree distribution (maximum AA degree/minumum AA degree) was 4.3, the block character [η] was 0.54 and the hydrolysis degree was 98.5% by mol.

PREPARATION EXAMPLE 4

(Preparation of AAPVA (d))

A kneader equipped with a reflux condenser was charged with 100 parts of a methanol solution of polyvinyl acetate (average polymerization degree 1440, completely hydrolyzed polyvinyl acetate measured according to JIS K6726) obtained by solution polymerization. The temperature was increased and when reflux started, 0.5 part of sulfuric acid was added as the catalyst and hydrolysis was conducted for 17 hours. Thereafter, the mixture was neutralized by sodium hydroxide to stop hydrolysis and repeatedly washed with methanol. Subsequently, the mixture was dried to obtain PVA having hydrolysis degree of 96.0% by mol (remaining acetic acid groups 4.0% by mol).

PVA powder having particle size of 63 to 1680 µm, swelling degree of 3.8 and elution ratio of 14.0% by weight was obtained by conducting thermal treatment at 80° C. for 60 minutes in the final step of drying in preparation of the above PVA. AAPVA (d) having AA degree of 0.50% by mol (diketene conversion ratio of 50% by mol) was prepared in the same manner as in Preparation Example 1 except that the above PVA powder was used. The AA degree was as follows.

44 to 74 µm: 0.72% by mol
74 to 105 µm: 0.66% by mol
105 to 177 µm: 0.51% by mol
177 to 297 µm: 0.47% by mol
297 to 500 µm: 0.44% by mol
500 to 1680 µm: 0.40% by mol The AA degree distribution (maximum AA degree/minumum AA degree) was 1.8, the block character [η] was 0.80 and the hydrolysis degree was 95.5% by mol.

PREPARATION EXAMPLE 5

(Preparation of Ethylenic Unsaturated Monomer Containing an Acetoacetic Ester Group)

To 150 parts of 2-hydroxyethyl methacrylate was added 0.05 part of triethylamine as a catalyst for diketene addition reaction and after the temperature was raised to 60° C., 96.9 parts (equivalent to 2-hydroxyethyl methacrylate) of diketene was dropped while stirring over 2 hours. The reaction was conducted further for 5 hours and the hydroxyl groups of 2-hydroxyethyl methacrylate were acetoacetic esterified to obtain acetoacetic esterified 2-hydroxyethyl methacrylate, in which all of the hydroxyl groups of 2-hydroxyethyl methacrylate were acetoacetic esterified.

TABLE 1

| AAPVA | Hydrolysis degree (% by mol) | Polymerization degree | AA degree (% by mol) | AA degree distribution | Block character |
|---|---|---|---|---|---|
| AAPVA (a) | 99.0 | 1280 | 0.50 | 1.4 | 0.55 |
| AAPVA (b) | 97.5 | 1280 | 0.50 | 1.4 | 0.54 |
| AAPVA (c) | 98.5 | 1280 | 0.45 | 4.3 | 0.54 |
| AAPVA (d) | 95.5 | 1280 | 0.50 | 1.8 | 0.80 |

EXAMPLE 1

A separable flask equipped with a stirrer, a reflux condenser, dropping funnel and a thermometer was charged with 80 parts of water, 10 parts of AAPVA (a), 0.02 part of sodium acetate as a pH adjuster, 0.002 part (10 ppm based on the aqueous emulsion after emulsion polymerization) of ferric chloride as an iron compound and 10 parts of a monomer (methyl methacrylate/n-butyl acrylate=80/20 (weight ratio), when Tg of the methyl methacrylate homopolymer is 105° C. and Tg of the n-butyl acrylate homopolymer is −54° C., Tg of the obtained copolymer is 57° C. by calculation). The temperature in the flask was raised to 60° C. while stirring, during which 5 parts of a 1% by weight aqueous solution of ammonium persulfate was added while the inside of the flask was replaced with nitrogen gas to start polymerization. The pH in the system before starting polymerization was 5.8. After initial polymerization was conducted for 30 minutes, the remaining 90 parts of the monomer was dropped over 4 hours and 1 part of the 5% by weight aqueous solution of ammonium persulfate was added every hour for five times to conduct polymerization. Also, together with the aqueous solution of ammonium persulfate, 1 part of a 5% by weight aqueous solution of sodium acetate was added every hour for five times. Thereafter, after aging for 1 hour at 75° C., the mixture was cooled and an emulsion I containing 55% by weight of solid content of the methyl methacrylate/n-butyl acrylate copolymer was obtained. The pH of the system during polymerization was maintained within the range of 4.2 to 5.8 and the pH of the ultimately obtained emulsion I was 4.8.

The obtained emulsion I was evaluated for the amount of coarse particles and the ratio of viscosity increase as described below.

(Amount of Coarse Particles)

The obtained aqueous emulsion was diluted with water and filtered with a wire mesh filter of 100 mesh. The weight of the resin content left on the wire mesh filter after drying for 3 hours at 105° C. was measured and the amount of coarse particles was calculated from the following equation.

amount of coarse particles(% by weight) = (weight of dried resin content on wire mesh filter/weight of solid content of emulsion) × 100

(Ratio of Viscosity Increase)

The obtained aqueous emulsion was stored at 25° C. and the change in viscosity was measured with a BROOKFIELD viscometer (rotor No. 4, 10 r.p.m., 25° C.). The ratio of viscosity increase was found from the following equation.

ratio of viscosity increase = viscosity of emulsion stored for 30 days at 25° C./viscosity of emulsion immediately after polymerization The obtained aqueous emulsion I had coarse particle amount of 0.0005% by weight and ratio of viscosity increase of 1.02.

A redispersible powder i was obtained by adding 5% by weight of fine powder of silicic anhydride (anti-caking agent) based on the solid content of aqueous emulsion I and spray drying under hot air of 120° C.

The obtained emulsion I was evaluated for wood adhesion properties in the following manner. The results are shown in Table 4.

(Wood Adhesion Properties)

To 100 parts of the emulsion was added 5 parts of an isocyanate compound (MDI, amount of isocyanate groups: $6.71 \times 10^{-3}$ mol/g) to obtain an adhesive composition. A test specimen for single wrap tension shear type was prepared using birch (Betula Maximowicziana REGAL, average air-dried specific gravity 0.70, water content 9% by weight) as the sample material. The amount of the adhesive applied was 280 g/m² and after pressing for 1 day at 20° C. at a pressing pressure of 1 MPa, pressure was released. Thereafter, heating treatment was conducted for 7 days at 20° C. and for 2 hours at 120° C. The adhesion test was conducted under normal conditions and also, under loading speed of 10 mm/min. after immersing in water for 1 day at 20° C. The test was conducted 5 times and the average value was found.

The obtained redispersible powder i was evaluated for compatibility with mortar in the following manner. The results are shown in Table 5.

(Mortar Compatibility Test)

Polymer cement mortar was prepared by mechanical kneading according to JIS A-6203. The mixing ratio of the mortar was normal Portland cement/Toyoura silica sand/redispersible powder/water=500/1500/50/375 (weight ratio). The change between the slump value immediately after mechanical kneading and the slump value after storing the mortar at 25° C. for 30 minutes was evaluated as the flowability of mortar. The smaller the value is the worse the flowability and the workability.

EXAMPLE 2

An emulsion II containing 55% by weight of solid content of a methyl methacrylate/n-butyl acrylate/acetoacetylated 2-hydroxyethyl methacrylate copolymer was obtained in the same manner as in Example 1, except that the monomer composition was adjusted to methyl methacrylate/n-butyl acrylate/acetoacetylated 2-hydroxyethyl methacrylate=64/16/20 (weight ratio) (when Tg of the acetoacetylated 2-hydroxyethyl methacrylate is 55° C., Tg of the obtained copolymer is 57° C. by calculation). The pH of emulsion II was 4.8, the coarse particle amount was 0.001% by weight and ratio of viscosity increase was 1.1. A redispersible powder ii was obtained in the same manner as in Example 1 and the wood adhesion properties of emulsion II and the compatibility with mortar of redispersible powder ii were evaluated. The results are shown in Tables 4 and 5.

EXAMPLE 3

An emulsion III containing 55% by weight of solid content of a methyl methacrylate/n-butyl acrylate copolymer was obtained in the same manner as in Example 1, except that AAPVA (b) was used. The pH of emulsion III was 4.8, the coarse particle amount was 0.0005% by weight and ratio of viscosity increase was 1.02. A redispersible powder iii was obtained in the same manner as in Example 1 and the wood adhesion properties of emulsion III and the compatibility with mortar of redispersible powder iii were evaluated. The results are shown in Tables 4 and 5.

EXAMPLE 4

An emulsion IV containing 55% by weight of solid content of a methyl methacrylate/n-butyl acrylate copolymer was obtained in the same manner as in Example 1, except that ferric chloride was not added. The pH of emulsion IV was 4.8, the coarse particle amount was 0.002% by weight and ratio of viscosity increase was 1.1. A redispersible powder iv was obtained in the same manner as in Example 1 and the wood adhesion properties of emulsion IV and the compatibility with mortar of redispersible powder iv were evaluated. The results are shown in Tables 4 and 5.

COMPARATIVE EXAMPLE 1

An emulsion X containing 55% by weight of solid content of a methyl methacrylate/n-butyl acrylate copolymer was obtained in the same manner as in Example 1, except that AAPVA (c) was used. The pH of emulsion X was 4.8, the coarse particle amount was 0.85% by weight and ratio of viscosity increase was 5.5. A redispersible powder x was obtained in the same manner as in Example 1 and the wood adhesion properties of emulsion X and the compatibility with mortar of redispersible powder x were evaluated. The results are shown in Tables 4 and 5.

COMPARATIVE EXAMPLE 2

An emulsion Y containing 55% by weight of solid content of a methyl methacrylate/n-butyl acrylate copolymer was obtained in the same manner as in Example 1, except that the polymerization monomer composition was adjusted to methyl methacrylate/n-butyl acrylate=45/55 (weight ratio) (Tg of the obtained copolymer is −3° C. by calculation). The pH of emulsion Y was 4.8, the coarse particle amount was 1.05% by weight and ratio of viscosity increase was 6.0. A redispersible powder y was obtained in the same manner as in Example 1 and the wood adhesion properties of emulsion Y and the compatibility with mortar of redispersible powder y were evaluated. The results are shown in Tables 4 and 5.

COMPARATIVE EXAMPLE 3

An emulsion Z containing 55% by weight of solid content of a methyl methacrylate/n-butyl acrylate copolymer was obtained in the same manner as in Example 1, except that except that AAPVA (d) was used. The pH of emulsion Z was 4.8, the coarse particle amount was 0.55% by weight and ratio of viscosity increase was 3.8. A redispersible powder z was obtained in the same manner as in Example 1 and the wood adhesion properties of emulsion Z and the compatibility with mortar of redispersible powder z were evaluated. The results are shown in Tables 4 and 5.

TABLE 2

| | Emulsifier | Monomer composition (weight ratio) | Tg (° C.) | Emulsion | Redispersible powder |
|---|---|---|---|---|---|
| Ex. 1 | AAPVA (a) | MMA/BA = 80/20 | 57 | Emulsion I | Powder i |
| Ex. 2 | AAPVA (a) | MMA/BA/AAHEMA = 64/16/20 | 57 | Emulsion II | Powder ii |
| Ex. 3 | AAPVA (b) | MMA/BA = 80/20 | 57 | Emulsion III | Powder iii |
| Ex. 4 | AAPVA (a) | MMA/BA = 80/20 | 57 | Emulsion IV | Powder iv |
| Com. Ex. 1 | AAPVA (c) | MMA/BA = 80/20 | 57 | Emulsion X | Powder x |
| Com. Ex. 2 | AAPVA (c) | MMA/BA = 45/55 | −3 | Emulsion Y | Powder y |
| Com. Ex. 3 | AAPVA (d) | MMA/BA = 80/20 | 57 | Emulsion Z | Powder z |

MMA: methyl methacrylate
BA: n-butyl acrylate
AAHEMA: acetoacetylated 2-hydroxy ethyl methacrylate

TABLE 3

| | Emulsion | Polymerization stability Amount of coarse particles (%) | Storage stability Ratio of viscosity increase |
|---|---|---|---|
| Ex. 1 | Emulsion I | 0.0005 | 1.02 |
| Ex. 2 | Emulsion II | 0.001 | 1.1 |
| Ex. 3 | Emulsion III | 0.0005 | 1.02 |

TABLE 3-continued

| | Emulsion | Polymerization stability Amount of coarse particles (%) | Storage stability Ratio of viscosity increase |
|---|---|---|---|
| Ex. 4 | Emulsion IV | 0.002 | 1.1 |
| Com. Ex. 1 | Emulsion X | 0.85 | 5.5 |
| Com. Ex. 2 | Emulsion Y | 1.05 | 6.0 |
| Com. Ex. 3 | Emulsion Z | 0.55 | 3.8 |

TABLE 4

| | | Adhesion property: tensile strength (MPa) | | | |
|---|---|---|---|---|---|
| | | Cured at 20° C. × 7 days | | Cured at 120° C. × 2 hours | |
| | Emulsion | Normal conditions | Immersed in 25° C. water | Normal conditions | Immersed in 25° C. water |
| Ex. 1 | Emulsion I | 9.2 | 3.8 | 11.0 | 6.7 |
| Ex. 2 | Emulsion II | 11.0 | 4.5 | 13.8 | 8.0 |
| Ex. 3 | Emulsion III | 9.2 | 4.0 | 10.2 | 7.0 |
| Ex. 4 | Emulsion IV | 9.0 | 3.6 | 10.0 | 6.4 |
| Com. Ex. 1 | Emulsion X | 8.1 | 3.2 | 9.2 | 6.0 |
| Com. Ex. 2 | Emulsion Y | 5.0 | 1.5 | 7.0 | 2.5 |
| Com. Ex. 3 | Emulsion Z | 7.9 | 2.8 | 8.8 | 5.6 |

TABLE 5

| | | Change over time in slump value (mm) of mortar containing powder | |
|---|---|---|---|
| | Redispersible powder | Immediately after mechanical kneading | After 30 min. at 25° C. |
| Ex. 1 | powder i | 36 | 36 |
| Ex. 2 | powder ii | 37 | 37 |
| Ex. 3 | powder iii | 35 | 35 |
| Ex. 4 | powder iv | 37 | 37 |
| Com. Ex.1 | powder x | 37 | 32 |
| Com. Ex. 2 | powder y | 37 | 30 |
| Com. Ex. 3 | powder z | 37 | 33 |

EXAMPLE 5

An adhesive composition comprising aqueous emulsion II (100 parts) obtained in Example 2, 10 parts of an isocyanate compound (MDI, amount of isocyanate groups: $6.71 \times 10^{-3}$ mol/g) and 2 parts of a wax emulsion was applied in the ratio described below for each 3'×6' particleboard. That is, the adhesive composition was applied to the wood chips in an amount of 30 to 32 parts based on 100 parts of the wood chips for the surface layer of the particleboard and 15 to 16 parts for the core layer. After forming, the wood chips were heat pressed with a hot press (temperature: 160 to 170° C., time: 8 to 10 minutes, pressure: 30 to 31 kgf/cm$^2$) to obtain a particleboard. The formaldehyde emission from the particleboard passed the $E_0$-type standard and the adhesion property passed the P-type level.

EXAMPLE 6

An adhesive composition comprising aqueous emulsion II (100 parts) obtained in Example 2, 10 parts of an isocyanate compound (MDI, amount of isocyanate groups: $6.71 \times 10^{-3}$ mol/g) and 2 parts of a wax emulsion was applied as the adhesive for the surface layers in the ratio described below for each 3'×6' particleboard. The isocyanate compound (MDI, amount of isocyanate groups: $6.71 \times 10^{-3}$ mol/g) was used as the adhesive for the core layer. That is, the adhesive composition was applied to 1500 parts of the wood chips for the surface layer of the particleboard, in an amount of 30 to 32 parts based on 100 parts of the wood chips and the isocyanate compound was applied to 1800 parts of the wood chips for the core layer, in an amount of 8 parts by weight based on 100 parts of the wood chips. After forming, the wood chips were heat pressed with a hot press (temperature: 160 to 170° C., time: 8 to 10 minutes, pressure: 30 to 31 kgf/cm$^2$) to obtain a particleboard. The formaldehyde emission from the particleboard passed the $E_0$-type standard and the adhesion property passed the P-type level.

EXAMPLE 7

An adhesive composition comprising aqueous emulsion II (100 parts) obtained in Example 2, 10 parts of an isocyanate compound (MDI, amount of isocyanate groups: $6.71 \times 10^{-3}$ mol/g) and 2 parts of a wax emulsion was applied in the ratio described below for each 3'×6' MDF. That is, the adhesive composition was applied to the dried fibers in an amount of 9 to 12 parts based on 100 parts of the fibers for the surface layer and in an amount of 8 parts based on 100 parts of the fibers for the core layer. The fibers were shaped into a mat by heat pressing with a hot press (temperature: 160 to 170° C., time: 8 to 10 minutes, pressure: 50 kgf/cm$^2$) to obtain a MDF. The formaldehyde emission from the MDF passed the $E_0$-type standard and the adhesion property passed the P-type level.

EXAMPLE 8

An adhesive composition comprising aqueous emulsion II (100 parts) obtained in Example 2, 10 parts of an isocyanate compound (MDI, amount of isocyanate groups: $6.71 \times 10^{-3}$ mol/g) and 2 parts of a wax emulsion was applied as the adhesive for the surface layers in the ratio described below for each 3'×6' MDF. The isocyanate compound (MDI, amount of isocyanate groups: $6.71 \times 10^{-3}$ mol/g) was used as the adhesive for the core layer. That is, the adhesive composition was applied to 1500 parts of the fibers for the surface layer of the MDF in an amount of 9 to 12 parts based on 100 parts of the fibers and to 1800 parts of the fibers for the core layer in an amount of 8 parts based on 100 parts of the fibers. After forming, the fibers were heat pressed with a hot press (temperature: 160 to 170° C., time: 8 to 10 minutes, pressure: 50 kgf/cm$^2$) to obtain a MDF. The formaldehyde emission from the MDF passed the $E_0$-type standard and the adhesion property passed the P-type level.

According to the present invention, an aqueous emulsion having excellent polymerization stability and standing stability and a redispersible powder can be obtained. Also, the aqueous emulsion and the redispersible fiber of the present invention are excellent as an adhesive for particleboards and an additive for cement and mortar.

What is claimed is:

1. An aqueous emulsion, comprising a polymer dispersed in a polyvinyl alcohol containing an acetoacetic ester group and 5 to 1000 ppm of an iron compound, said polymer being a homopolymer obtained by polymerizing a (meth)acrylic acid or its ester in the presence of the polyvinyl alcohol containing an acetoacetic ester group or a copolymer obtained by polymerizing two or more kinds of (meth)acrylic acids or (meth)acrylic esters in the presence of the polyvinyl alcohol containing an acetoacetic ester group;

wherein said polyvinyl alcohol containing an acetoacetic ester group has block character $[\eta]$ of 0.3 to 0.6, hydrolysis degree of at least 97% by mol and acetoacetic esterification degree of 0.01 to 1.5% by mol, the value obtained by dividing the maximum value by the minimum value of the respective average acetoacetic esterification degree for each of said polyvinyl alcohol containing an acetoacetic ester group separated by particle size of 44 to 74, 74 to 105, 105 to 177, 177 to 297, 297 to 500 and 500 to 1680 μm is 1.0 to 3.0, and wherein said aqueous emulsion is characterized in that the amount of coarse particles in the aqueous emulsion is at most 0.002% by weight of solid of the emulsion.

2. The aqueous emulsion of claim 1, wherein said polymer is prepared by polymerizing the acrylic monomer under pH of 3 to 8.

3. The aqueous emulsion of claim 1, wherein said polymer is prepared by polymerizing the acrylic monomer using persulfate as a polymerization initiator.

4. The aqueous emulsion of claim 1, wherein the glass transition temperature of said polymer is 10 to 80° C.

5. The aqueous emulsion of claim 1, wherein said polymer is subject to further copolymerizing with an ethylenic unsaturated monomer containing an acetoacetic group.

6. An adhesive composition comprising the aqueous emulsion of claim 1.

7. The adhesive composition of claim 6, which further comprises an isocyanate crosslinking agent.

8. An adhesive for a particleboard comprising the adhesive composition of claim 6.

9. An adhesive for a middle density fiberboard comprising the adhesive composition of claim 6.

10. A powder obtained from the aqueous emulsion of claim 1.

* * * * *